United States Patent
Takizawa

[11] Patent Number: 5,125,293
[45] Date of Patent: Jun. 30, 1992

[54] ADAPTIVE CONTROL OF SERVO ACTIVATING HYDRAULIC FLUID PRESSURE FOR A SHIFT IN AN AUTOMATIC TRANSMISSION

[75] Inventor: Satoshi Takizawa, Yokosuka, Japan

[73] Assignee: Nissan Motor Co., Ltd., Yokohama, Japan

[21] Appl. No.: 626,729

[22] Filed: Dec. 17, 1990

[30] Foreign Application Priority Data

Dec. 19, 1989 [JP] Japan .................. 1-327213

[51] Int. Cl.⁵ ............................... B60K 41/18
[52] U.S. Cl. ............................ 74/866; 74/844; 74/867
[58] Field of Search .................. 74/844, 866, 867

[56] References Cited

U.S. PATENT DOCUMENTS

| | | | |
|---|---|---|---|
| 3,106,104 | 10/1963 | Harry | 74/844 |
| 4,474,081 | 10/1984 | Kinugasa et al. | 74/844 |
| 4,653,351 | 3/1987 | Downs et al. | 74/866 |
| 4,807,497 | 2/1989 | Yasue et al. | 74/867 |
| 4,939,957 | 7/1990 | Asano et al. | 74/867 X |
| 4,943,921 | 7/1990 | Baltusis et al. | 74/866 X |
| 4,945,481 | 7/1990 | Iwatsuki et al. | 74/866 X |
| 4,961,315 | 10/1990 | Ishikawa et al. | 74/844 X |

FOREIGN PATENT DOCUMENTS

| | | |
|---|---|---|
| 0007739 | 2/1980 | European Pat. Off. |
| 57-184755 | 11/1982 | Japan |
| 62-166118 | 7/1987 | Japan |
| 64-87949 | 4/1989 | Japan |

OTHER PUBLICATIONS

"Nissan Full-Range Automatic Transmission RE4R-03A Type, Service Manual, (A261C10)", 1988.

Primary Examiner—Richard Lorence
Assistant Examiner—Matthew Stavish
Attorney, Agent, or Firm—Foley & Lardner

[57] ABSTRACT

The present invention relates to an adaptive correction of servo activating hydraulic fluid pressure during shift. In one embodiment according to the present invention, a ratio of a mass airflow rate of intake air admitted to an engine (Qa) to a revolution speed of a transmission output shaft (No) is calculated, and a first parameter (TqSEN) is determined in response to the ratio (Qa/No). Besides, a second parameter (No) is the transmission output shaft speed (No). The servo activating hydraulic fluid pressure is determined in response to this first and second parameters. In another embodiment, a turbine shaft speed (Nt) is calculated from the output shaft speed (No) and a gear ratio (g) of a gear position established before shifting. The turbine shaft revolution speed (Nt) is used instead of the output shaft speed (No) in determining the first parameter (TqSEN).

6 Claims, 10 Drawing Sheets

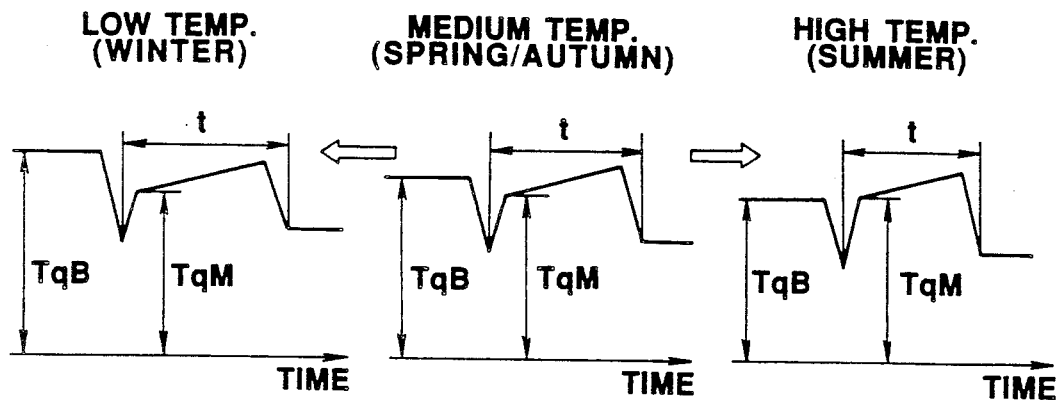
FIG.14A FIG.14B FIG.14C
*(PRIOR ART) (PRIOR ART) (PRIOR ART)*
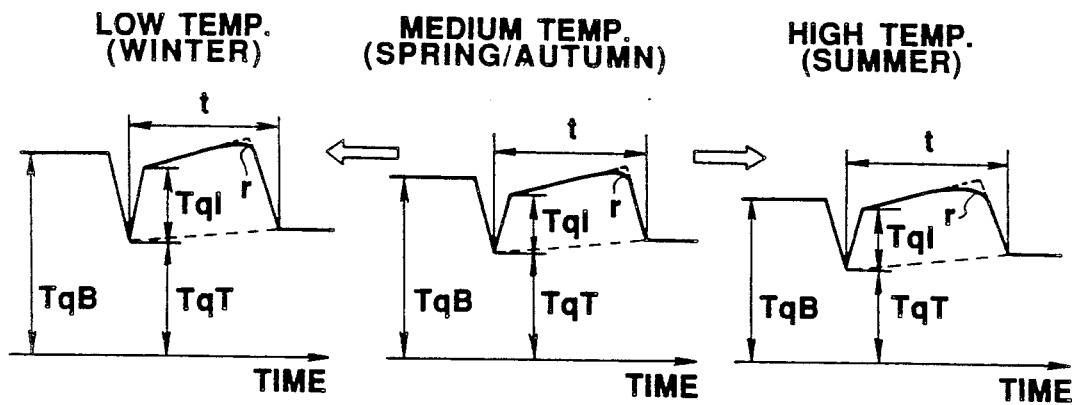
FIG.15A FIG.15B FIG.15C

LOW ALTITUDE (0mmHg)

HIGH ALTITUDE

LOW ALTITUDE (0mmHg)

HIGH ALTITUDE

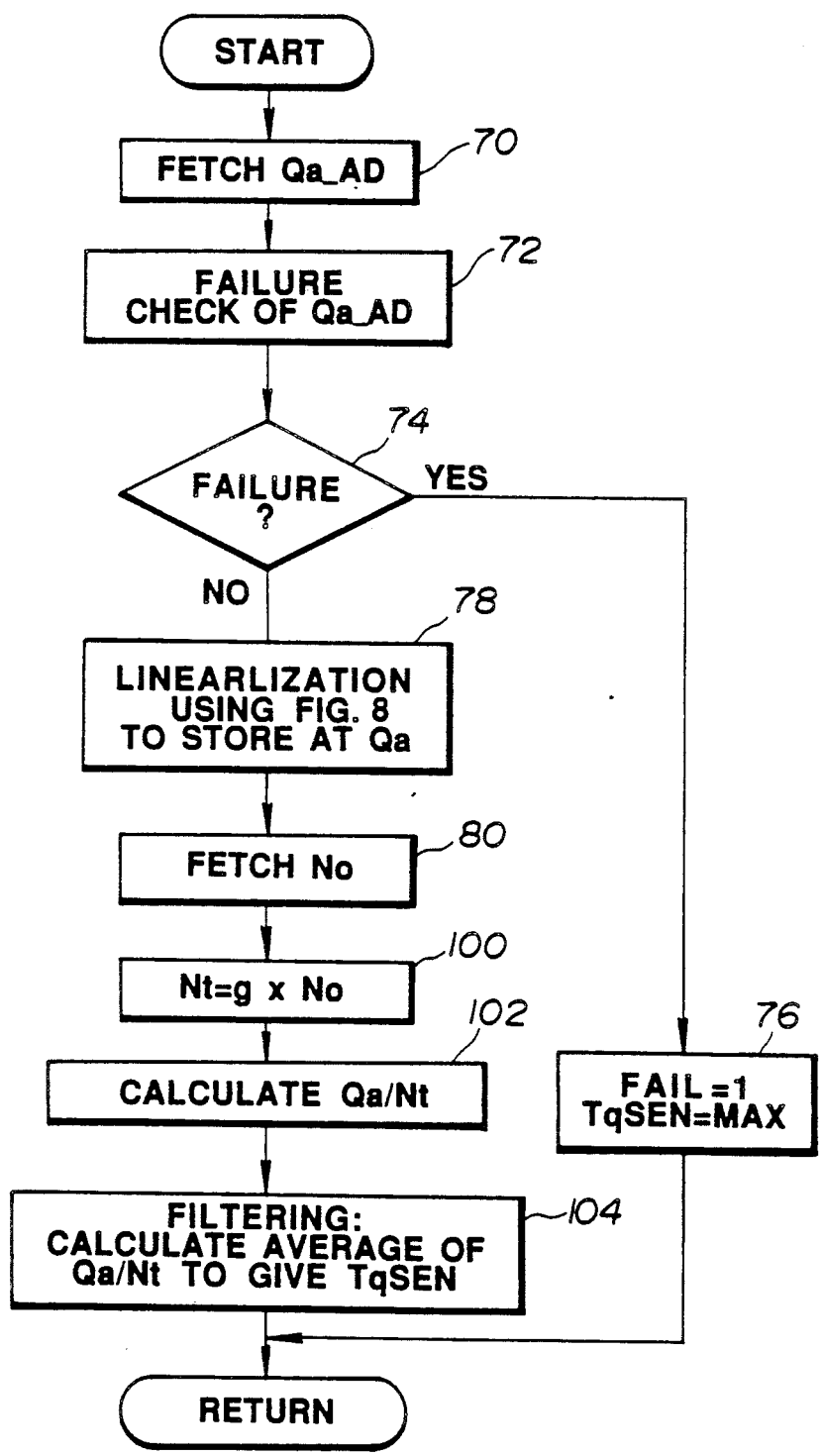

ADAPTIVE CONTROL OF SERVO ACTIVATING HYDRAULIC FLUID PRESSURE FOR A SHIFT IN AN AUTOMATIC TRANSMISSION

BACKGROUND OF THE INVENTION

The present invention relates to a method of and a system for controlling servo activating hydraulic fluid pressure for a motor vehicle automatic transmission.

An automatic transmission of the RE4R03A type is known. This known automatic transmission is described in a publication "NISSAN FULL-RANGE AUTOMATIC TRANSMISSION RE4R03A TYPE, SERVICE MANUAL, (A261C10)" issued on March 1988 by NISSAN MOTOR COMPANY LIMITED. According to this publication, it is known to determine servo activating hydraulic fluid pressure in response to a throttle opening degree. A plurality of line pressure tables are stored in a microcomputer based automatic transmission (A/T) control unit. Each of the line pressure tables contains line pressure values versus various throttle opening degrees. In this control the throttle opening degree is used to indicate the magnitude of the load on the engine. For 1-2 upshift, for example, a table look-up operation of a line pressure table for 1-2 upshift is performed using throttle opening degree to determine a servo activating hydraulic fluid pressure supplied to engage an on-coming friction device. In this case, the throttle opening degree is used to represent a driving force or a torque before the 1-2 upshift. Thus, the servo activating hydraulic fluid pressure is fixed to a single value determined by throttle opening degree detected before the shift.

This known system for controlling servo activating hydraulic fluid pressure is not satisfactory in that, with the same throttle opening degree, a servo activating hydraulic fluid pressure remains invariable even if there occurs a change in driving force.

An object of the present invention is to provide an adaptive correction of servo activating hydraulic fluid pressure during a shift to meet an ambient change.

SUMMARY OF THE INVENTION

According to one aspect of the present invention, there is provided a system for controlling a servo activating hydraulic fluid pressure of an automatic transmission of a motor vehicle including an engine, the automatic transmission having an output shaft and being shiftable between a plurality of gear positions, the system comprising:

means for detecting an airflow rate of intake air admitted to the engine and generating an airflow rate indicative signal indicative of said airflow rate detected;

means for detecting a predetermined variable that is in a predetermined relationship with revolution speed of the output shaft and generating a predetermined variable indicative signal indicative of said predetermined variable detected; and means responsive to said air flow rate indicative signal and said predetermined variable indicative signal for determining a first parameter in response to said airflow rate and said predetermined variable, and a second parameter in response to said predetermined variable, and determining the servo activating hydraulic fluid pressure in response to said first and second parameters.

According to another aspect of the present invention, there is provided a method of controlling servo activating hydraulic fluid pressure of an automatic transmission of a motor vehicle including an engine, the automatic transmission having an output shaft and being shiftable between a plurality of gear positions, the method comprising the steps of:

detecting an airflow rate of intake air admitted to the engine;

detecting a predetermined variable that is in a predetermined relationship with revolution speed of the output shaft;

determining a first parameter in response to said airflow rate and said predetermined variable;

determining a second parameter in response to said predetermined variable; and determining the servo activating hydraulic fluid pressure in response to said first and second parameters.

BRIEF DESCRIPTION OF THE DRAWINGS

FIGS. 14A, 14B, and 14C are torque curves during 1-2 upshift at different ambient temperatures with the same throttle opening degree when an on-coming friction device is engaged by a servo activating hydraulic fluid pressure determined in response to throttle opening degree;

FIGS. 15A, 15B, and 15C are torque curves during 1-2 upshift at the different ambient temperatures with the same throttle opening degree when the on-coming friction device is engaged by a servo activating hydraulic fluid pressure determined according to the present invention;

FIG. 18 is a flow diagram of an alternative sub routine for calculating the first parameter TgSEN.

DETAILED DESCRIPTION OF THE INVENTION

Figure 1:
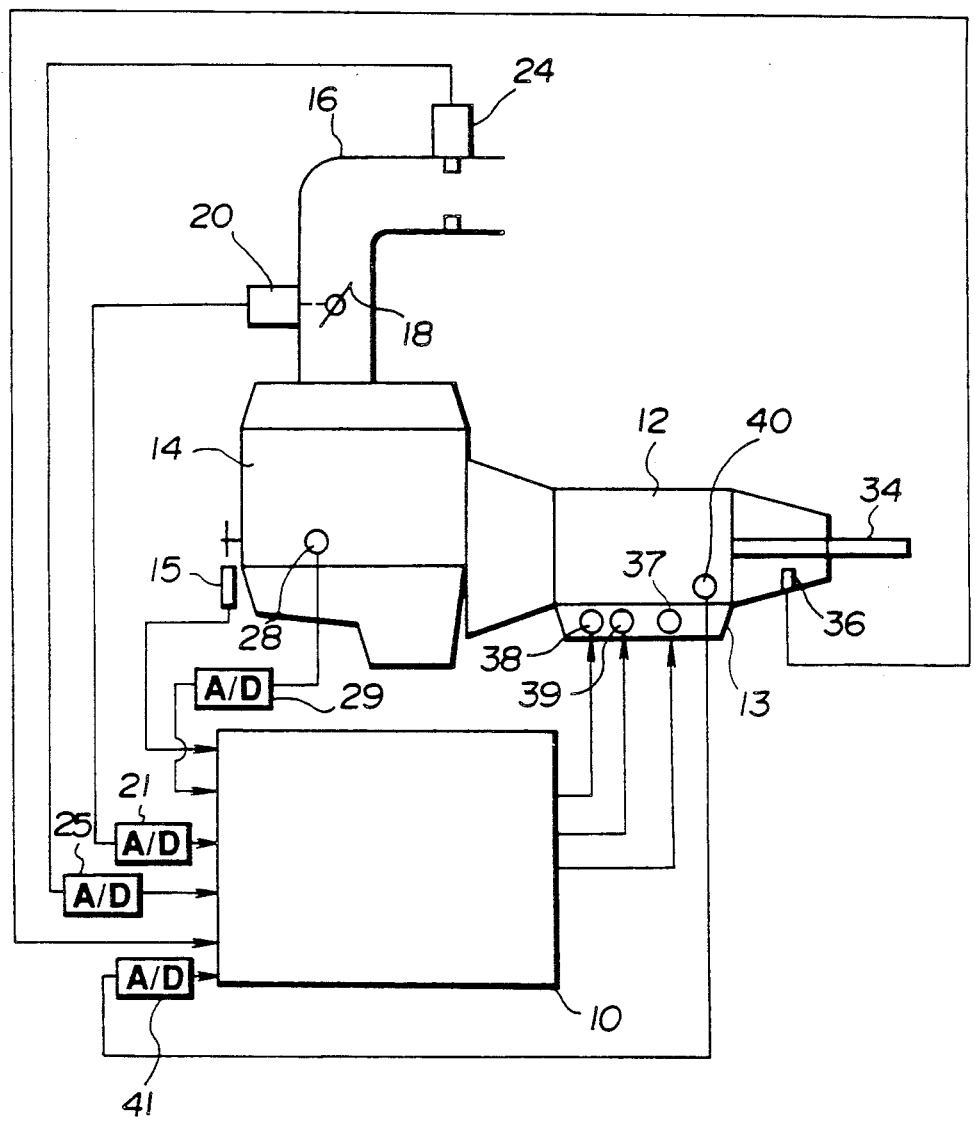
FIG. 1 is a block diagram of a motor vehicle power train.

FIG. 1 shows a motor vehicle power train including an automatic transmission 12 and an engine 14.

The automatic transmission 12 includes a torque converter, a gear train, and various friction or torque establishing devices, such as clutches and brakes. The torque converter includes a pump impeller drivingly connected to an output shaft of the engine, a turbine runner, and a stator. The pump impeller is in driving connection with a pump. The turbine runner is connected to an input shaft of the gear train. The gear train has an output shaft 34.

The automatic transmission 12 has a control valve assembly 13 provided with a line pressure solenoid 37, a first shift solenoid 38, and a second shift solenoid 39. These solenoids 37, 38, and 39 are controlled by a microcomputer based automatic transmission (A/T) control unit 10 including a central processor unit (CPU), a read only memory (ROM), a random access memeory (RAM), and an input/output interface circuit (I/O).

An engine speed sensor 15 detects an engine speed (engine rpm) of the engine and generates pulses indicative of the engine speed detected. Mounted within an intake passage 16 is a throttle valve 18 which opens in degrees. A throttle sensor 20 detects an opening degree of the throttle valve (throttle position) 18 and generates an analog signal indicative of the throttle opening degree detected. The analog signal of the throttle sensor 20 is supplied to an analog-to-digital converter (A/D) 21. Upstream of the throttle valve 18 is arranged a mass air flow meter 24 which detects a mass airflow rate of intake air inducted by the engine 14, and generates an analog signal indicative of the mass airflow rate. This analog signal is supplied to an analog-to-digital converter (A/D) 25. The mass airflow meter 24 is of the well-known hot wire film type. An engine coolant temperature 28 detects the temperature of engine coolant and generates an analog signal indicative of the engine coolant temperature detected. This analog signal is supplied to an analog-to-digital converter (A/D) 29.

An output shaft speed sensor 36 detects a revolution speed of the output shaft 34 and generates pulses indicative of the output shaft revolution speed detected. The output shaft speed sensor 36 serves as a transmission mount vehicle speed sensor. Another vehicle speed sensor is mounted in a vehicle speed meter within a passenger compartment of the vehicle. An automatic transmission fluid (ATF) temperature sensor 40 detects the temperature of an automatic transmission fluid and generates an analog signal indicative of the ATF temperature detected. This analog signal is supplied to an analog-to-digital (A/D) converter 41.

In FIG. 1, A/D converters 21, 25, 29 and 41 are illustrated as being separated from the control unit 10 for ease of explanation in the following description. Actually, the functions of these analog-to-digital converters are incorporated in the I/O interface circuit of the control unit 10.

Except the mass airflow meter 24, the motor vehicle power train illustrated in FIG. 1 is substantially the same as described in the before-mentioned publication "NISSAN FULL-RANGE AUTOMATIC TRANSMISSION RE4R03A TYPE, SERVICE MANUAL, (A261C10)" issued on March, 1988 by NISSAN MOTOR COMPANY LIMITED. For detailed description, reference should be made to this publication.

Figure 2:
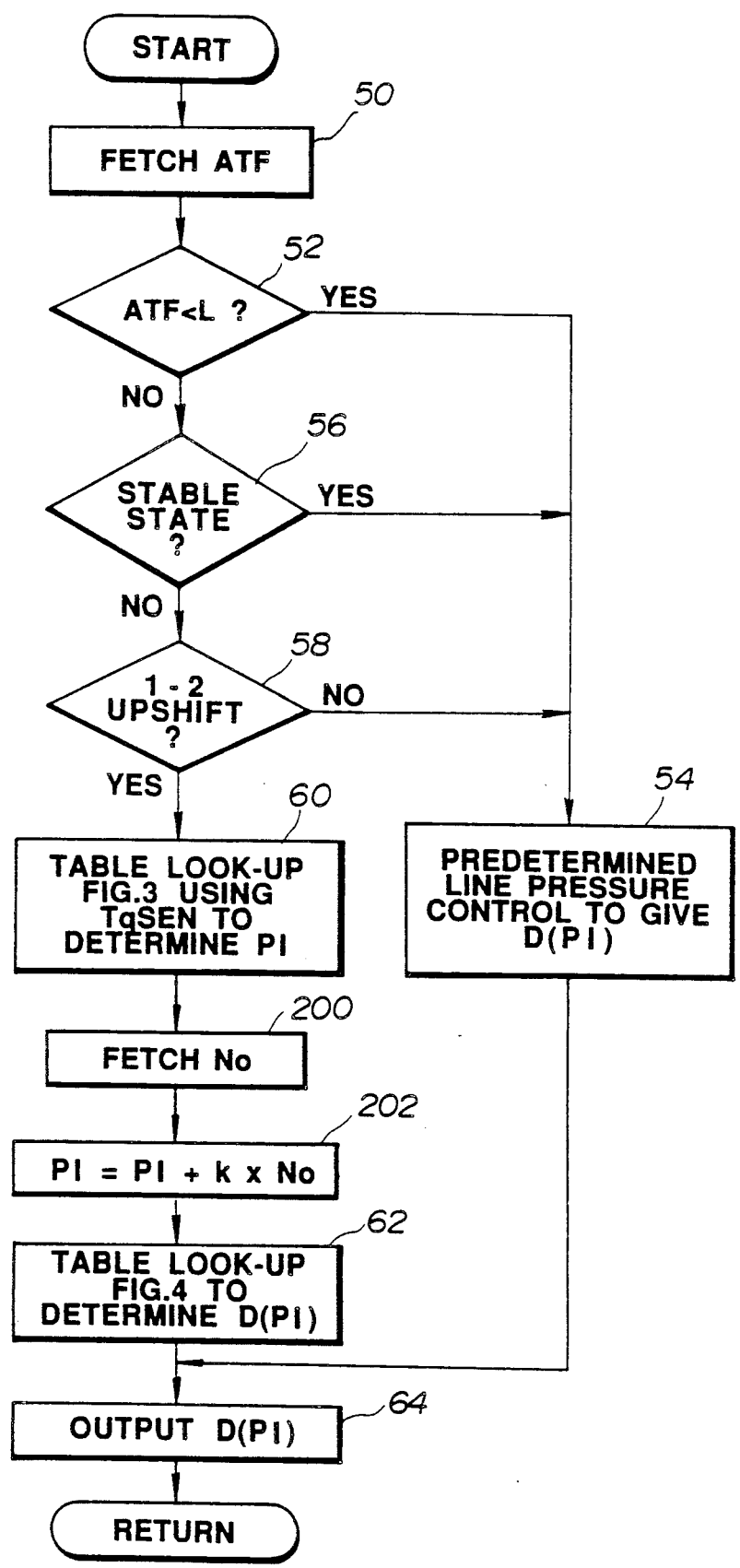
FIG. 2 a flow diagram of a main routine for determining servo activating hydraulic fluid pressure in the form of a line pressure.
Figure 6:
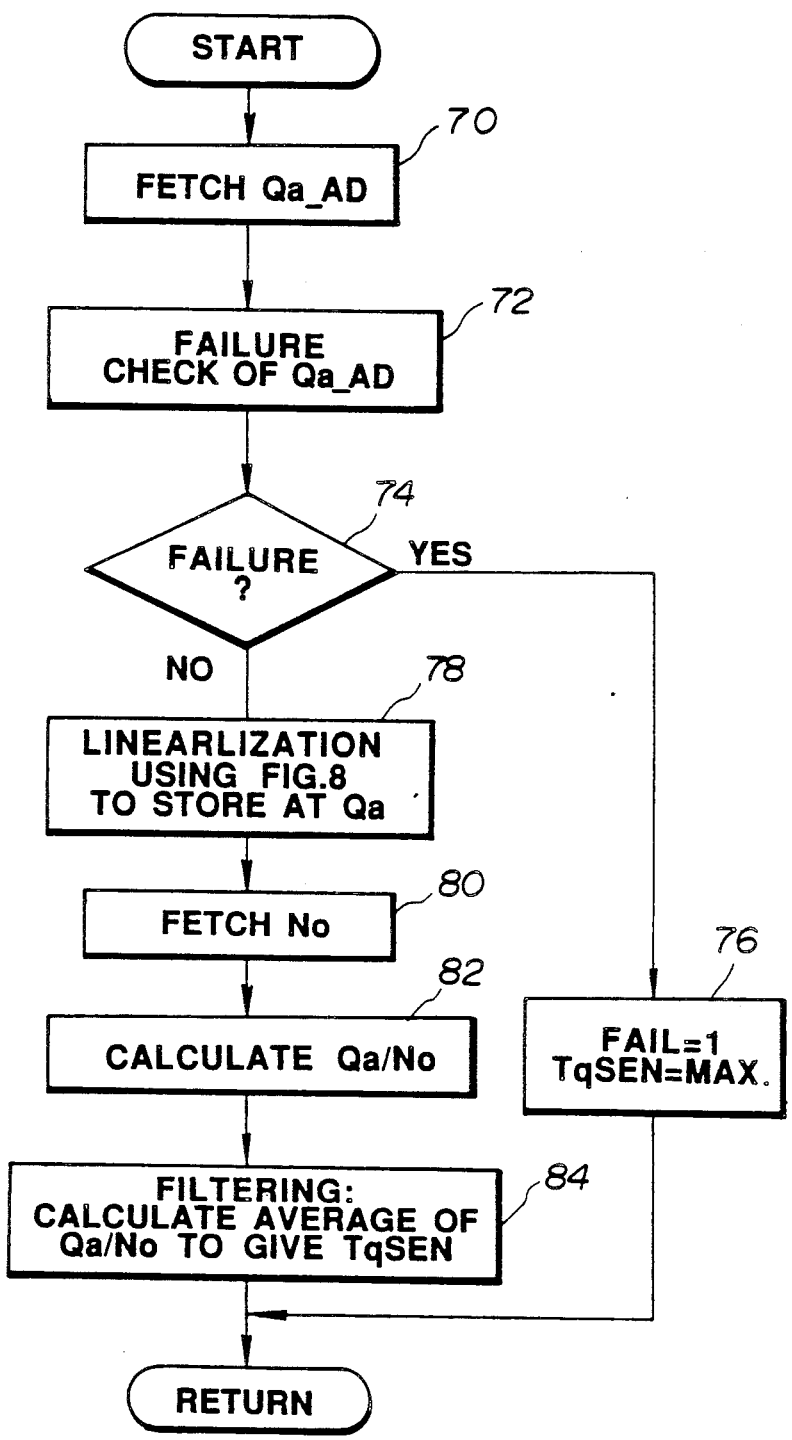
FIG. 6 is a flow diagram of a sub routine for calculating a first parameter TgSEN.

Referring to FIGS. 2 and 6, FIG. 2 shows a main routine for determining a servo activating hydraulic fluid pressure, and FIG. 6 shows a sub routine for calculating a first parameter TqSEN which is used in the main routine in determining servo activating hydraulic fluid pressure during 1-2 upshift.

Figure 7:
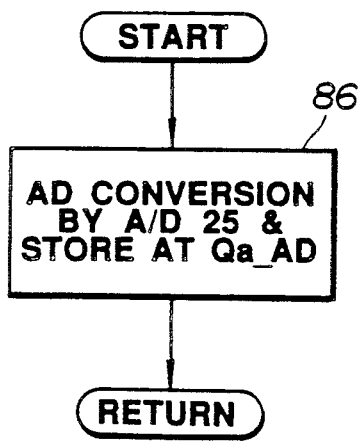
FIG. 7 is a flow diagram of an analog to digital (AD) conversion routine whereby analog output signal of a mass airflow meter to digital signal to store result at Qa_AD.
Figure 8:
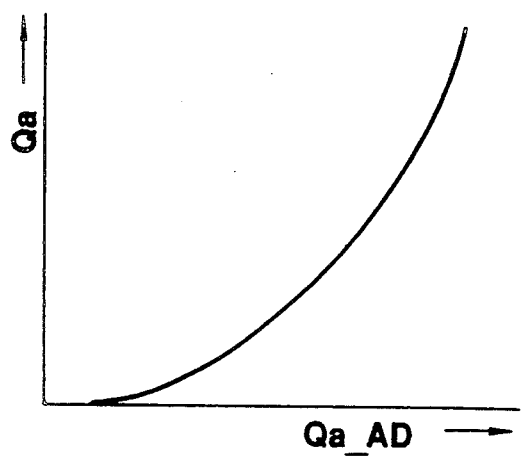
FIG. 8 shows a linear Qa-Qa_AD characteristic of the mass airflow meter.
Figure 9:
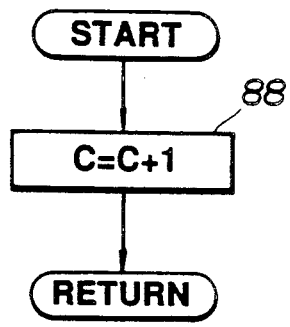
FIGS. 9 and 10 are flow diagrams for calculating revolution speed (No) of transmission output shaft.
Figure 10:
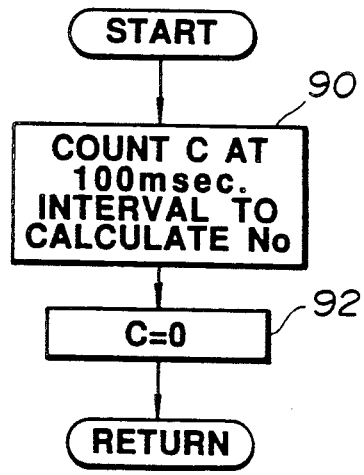

Referring to FIG. 7, execution of this program is repeated at an interval of 5 msec. In a step 86, analog output signal of mass airflow meter 24 is converted to digital signal by A/D converter 25 and the result is stored at Qa_AD in RAM. Actual mass airflow rate detected by the mass airflow meter 24 is in a predetermined relationship with output signal thereof. This predetermined relationship is illustrated by characteristic curve shown in FIG. 8. In FIG. 8, the vertical axis indicates actual mass airflow rate, while the horizontal axis indicates digital signal produced after analog to digital conversion of the output signal of mass airflow meter 24. FIGS. 9 and 10 show programs for calculating revolution speed of transmission output shaft 34. Execution of the program shown in FIG. 9 is initiated by pulse generated by output shaft speed sensor 36. In step 88, increment of up-counter C is made. Execution of the program shown in FIG. 10 is repeated at an interval of 100 msec. In step 90, the content of the counter C is counted and the result is used to calculate the output shaft speed. The result of this calculation is stored at No in RAM as output shaft speed. In step 92, the counter C is cleared.

Referring back to FIG. 6, execution of this program is repeated to determine the first parameter TqSEN which is used during execution of the program shown in FIG. 2. In step 70, the digital data Qa_AD is fetched. In step 72, a failure check of the data Qa_AD is conducted. In step 74, it is determined whether failure exists or not. If the inquiry in step 74 results in negative, the program proceeds to step 76 where failure flag FAIL is set and parameter TqSEN is not calculated based on the data Qa_AD fetched in step 70. The parameter TqSEN is set equal to its maximum value MAX. If the inquiry in step 74 results in affirmative and thus the data Qa_AD fetched in step 70 is reliable, the program proceeds to step 78. In step 78, a table look-up operation of the characteristic curve shown in FIG. 8 is performed using Qa_AD to store the result at Qa in RAM as mass airflow rate. In step 80, the data No is fetched. In step 82, a ratio Qa/No is calculated. In step 84, the latest data of Qa/No, namely (Qa/No)new, is used to update an average, namely (Qa/No)av. In this embodiment, the average is a weighted average which is expressed as, $$(Qa/No)av = (1/4) \times (Qa/No)new + (3/4) \times (Qa/No)av.$$

Then, the parameter TgSEN is given which is expressed as, $$TqSEN = Kc \times (Qa/No)av.$$

where, Kc: a predetermined constant.

Referring to FIG. 1 again, analog signal of automatic transmission fluid (ATF) temperature sensor 40 is converted into digital signal by A/D converter 41 and the result is stored at ATF in RAM.

Referring to FIG. 2, in step 50, the data ATF is fetched. In step 52, it is determined whether or not ATF is lower than a predetermined temperature value L, for example 60° C. If this inquiry results in affirmative, the program proceeds to step 54 where a table look-up operation of line pressure table for low temperature is performed using throttle opening degree to give duty D(P1). In step 64, OFF duty duration per ON-OFF cycle of line pressure solenoid 37 (see FIG. 1) is modulated in response to the duty D(P1) given by predetermined line pressure control starategy in step 54. If the inquiry in step 52 results in negative, the program proceeds to step 56 where it is determined whether or not automatic transmission 12 is in stable state after comparing a desired gear position with an actual gear position. If the desired gear position is equal to the actual gear position, a ratio shift is not required and thus the transmission 12 is in stable state and the inquiry in step 56 results in affirmative. In this circumstance, the program proceeds from step 56 to step 54. In step 54, a table look-up operation of line pressure table for usual temperature is performed using throttle opening degree to give duty D(P1). Then, in step 64, the line pressure solenoid 37 is controlled on the duty D(P1) obtained in step 54 to give stable-state line pressure vs., throttle opening degree characteristic. If the inquiry in step 56 results in negative, the type of shift required is checked in step 58. In step 58, it is determined whether 1-2 upshift is required or not. If the type of shift required is not 1-2 upshift, a table look-up operation of the usual line pressure table is performed using throttle opening degree to give a duty D(P1) and the program proceeds to step 64. The line pressure control performed in step 54 is substantially the same as the conventional line pressure control described on Pages I-29 to I-30 of the publication "NISSAN FULL-RANGE AUTOMATIC TRANSMISSION RE4R03A TYPE, SERVICE MANUAL, (A261C10)."

Figure 3:
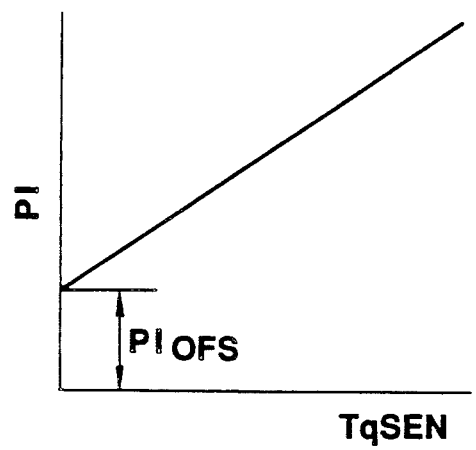
FIG. 3 is a graphical representation of a base portion of servo activating hydraulic fluid pressure corresponding to a torque transmitting portion, showing a pressure table used for a table look-up operation in FIG. 2.
Figure 4:
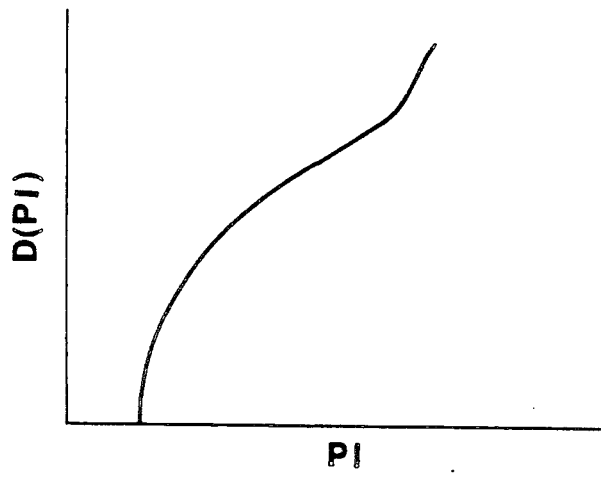
FIG. 4 shows a duty conversion table used for a table look-up operation in FIG. 2.
Figure 5:
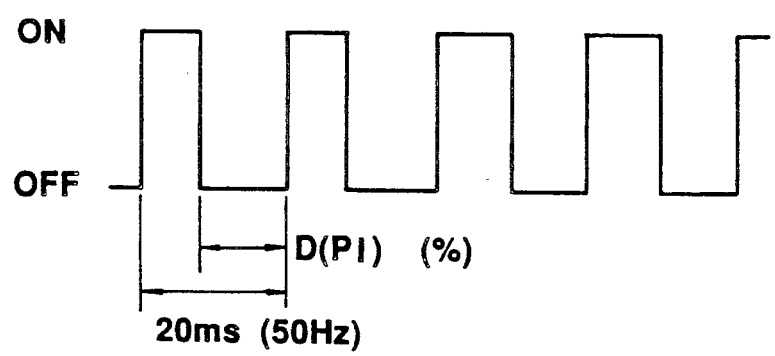
FIG. 5 shows a duty output.

If the inquiry in step 58 results in affirmative and thus 1-2 upshift is required, the program proceeds to step 60 where a base portion of servo activating hydraulic fluid pressure corresponding to torque transmitting portion is determined based on the first parameter TqSEN. In step 60, a table look-up operation of table shown in FIG. 3 is performed using parameter TqSEN to store the result at PI in RAM. The content of the PI therefore is indicative of the base portion of servo activating hydraulic fluid pressure. Then, the program proceeds to step 200 and then to step 202. In step 200, the output shaft speed data No is fetched. This data No is used as a second parameter. The output shaft speed No is used as a second parameter. In step 202, this second parameter is used in determining an additional portion of servo activating hydraulic fluid pressure for absorbing the inertia energy. The additional portion is expressed as the product of k and No, where k is a constant. Alternatively, the additional portion may be determined by a table look-up operation of a table using the second parameter No. In the step 202, the data PI is increased by k×Mo. In step 62, a table look-up operation of duty conversion table shown in FIG. 4 is performed using the data PI to give duty D(P1). Then, in step 64, line pressure solenoid 37 is controlled in response to duty D(P1) determined in step 62. In FIG. 3, the reference character $Pl_{OFS}$ denotes an offset that is predetermined taking a return spring of the fluid operated servo of the on-coming friction device into account. As shown in FIG. 5, ON-OFF cycle of line pressure solenoid 37 is repeated 50 times per one second. Thus, one cycle is 20 msec, and frequency is 50 Hz. The OFF duration in one cycle is determined by duty D(P1). The relationship between servo activating hydraulic pressure (line pressure) and duty D(P1) is such that the hydraulic fluid pressure is in proportion to duty D(P1).

Referring again to FIG. 6, in step 84, the weighted average of Qa/No is calculated. This process which is often called as "filtering" is preferrable in eliminating deviation of Qa/No due to variation in mass airflow rate (Qa) and error in calculating output shaft speed (No) so as to minimize influence on servo activating hydraulic fluid pressure. Alternatively, a running average may be used instead of the weighted average. The running average is expressed as, $$(Qa/No)av = (1/N) \times [(Qa/No)\text{old}_N + (Qa/No)\text{old}_{N-1} \ldots + (Qa/No)\text{old}_1],$$

where, N: a number of sampled data;

$(Qa/No)\text{old}_N$; $(Qa/No)\text{old}_{N-1}$;

$(Qa/No)\text{old}_{N-2}$; ... $(Qa/No)\text{old}_1$: data sampled in previous cycles.

Figure 12:
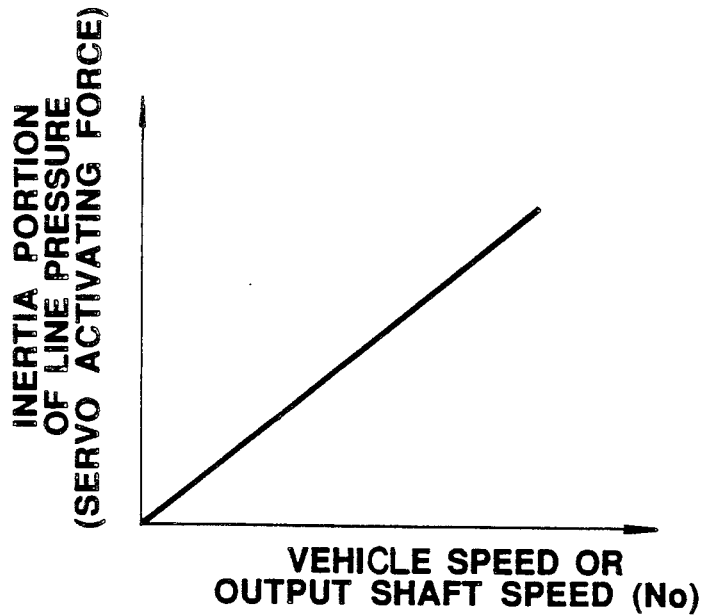
FIG. 12 is a graphical representation of an additional portion of a servo activating hydraulic fluid pressure corresponding to an inertia portion.

Referring to FIGS. 3 and 12, FIG. 3 shows a variation in the base portion of servo activating hydraulic fluid pressure corresponding to the torque transmitting portion versus the first parameter TqSEN, while FIG. 12 shows the variation in the additional portion of servo activating hydraulic fluid corresponding to the inertia portion versus the second parameter No, namely output shaft speed. The second parameter may be in the form of a vehicle speed.

Figure 11:
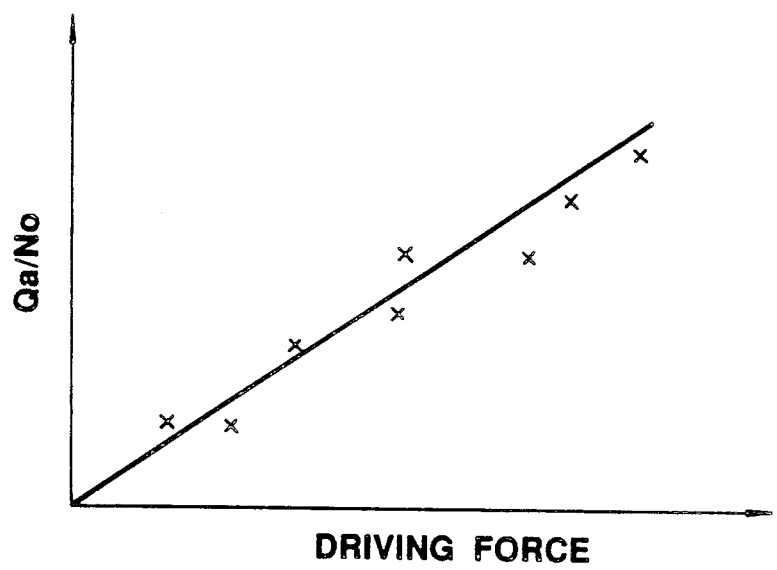
FIG. 11 shows experimental data (Qa/No) plotted versus driving force.

Referring to FIG. 11, experimental data are plotted (reference character x). As seen from FIG. 11, there is a predetermined relationship that the ratio Qa/No is in proportion to a driving force.

As previously explained, the base portion of servo activating hydraulic fluid pressure during 1-2 upshift is determined in response to the first parameter TqSEN that is variable with the ratio Qa/No. This means that the base portion of the servo activating hydraulic fluid pressure is variable with a torque before upshift since the torque before upshift is in proportion to a driving force of the engine.

Figure 13:
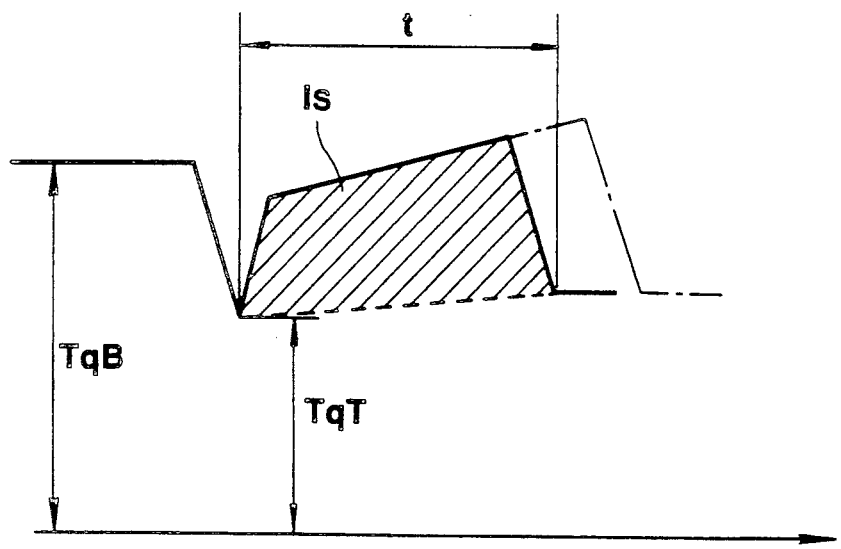
FIG. 13 is a representative torque curve during an upshift showing the inertia portion (Is) by shadowed area.

FIG. 13 is a representative torque curve model during a 1-2 upshift. In FIG. 13, the reference character TqT denotes a base portion of torque for transmitting torque during the shift, and the shadowed zone denoted by the reference character Is illustrates an amount of the inertia energy that is variable with the output shaft speed of the transmission (or vehicle speed) during the shift. Practically, the base portion of a torque cannot be clearly separated from the rest of the torque for absorbing the inertia energy owing to torque variation caused by the torque converter.

With the same output shaft speed No, the amount of inertia energy to be absorbed during an upshift is the same, and the area of the shadowed zone is the same. Thus, at the common shift point, if the vertical width of the shadowed zone is increased in FIG. 13, the horizontal width, namely the time axis, of the shadowed zone decreases Thus, the time interval t required for a shift becomes short if the vertical width of the shadowed zone is increased.

In FIG. 13, with the same input torque and servo activating hydraulic fluid pressure, the amount of inertia energy to be absorbed during the shift increases with an increase in output shaft speed at the shift point. Thus, if the shift point shifts toward high vehicle speed side, the shadowed area Is expands toward a zone illustrated by one-dot chain line. Thus, the time interval t increases as vehicle speed increases. If the time interval t is prolonged, the on-coming friction device to be engaged during the shift is subject to baking. Thus, it is preferrable to set the limit to the time interval t. For example, 500 milli seconds or 600 milli seconds is preferrable as the time interval t.

As will now be understood from the preceding description, the base portion of servo activating hydraulic fluid pressure is determined in response to the first parameter TqSEN, and the additional portion is determined in response to the second parameter No. The base portion is given in view of FIG. 3, while, the additional portion is given in view of FIG. 12.

In other words, the servo activating hydraulic fluid pressure is variable with the ratio Qa/No which closely follows variation in input torque and also with inertia portion (k×No) which follows variation in output shaft speed or vehicle speed. An increase in the servo activating hydraulic fluid pressure in response to the output shaft speed or vehicle speed suppresses an increase in time interval t that tends to prolong owing to an increase in the inertia energy if the hydraulic servo activating hydraulic fluid pressure is left invariable with the output shaft speed or vehicle speed. Thus, the time interval t is adjusted to a satisfactory level if the additional portion of the servo activating hydraulic fluid pressure is variable with the output shaft speed or vehicle speed.

From the preceding description, it will be appreciated that the servo activating hydraulic fluid pressure used to engage the on-coming friction device to be engaged during the upshift is divided into the base portion that is in proportion to the first parameter TqSEN and the additional portion that is in proportion to the second parameter in the form of the output shaft speed No or vehicle speed. The first parameter TqSEN is indicative of driving force or output torque of the engine (see FIG. 11). The second parameter No is in proportion to the amount of inertia energy to be absorbed during the upshift.

Referring to FIGS. 14A, 14B, and 14C, it is described as to what influence is on a ratio shift due to variance in ambient temperature, and referring to FIGS. 15A, 15B, and 15C, it is described as to how such influence is removed according to servo activating hydraulic pressure determined in response to the first parameter TqSEN and second parameter No.

In determining servo activating hydraulic fluid pressure for a ratio shift, for example, 1-2 upshift, it is the conventional practice to use a pressure table which contains optimum servo activating hydraulic pressure values for 1-2 upshift versus different throttle opening degrees. The pressure values of the table are set for optimum performance of on-coming friction device during the upshift under standard conditions where the upshift is initiated at a preset vehicle speed for a given throttle opening degree in accordance with a shift point mapping for drive range, at low altitude, and at medium ambient temperature.

Air density increases as ambient temperature decreases in winter, while it decreases as ambient temperature increases in summer. Engine output increases in response to an increase in air density, and decreases in response to a decrease in air density. FIGS. 14A, 14B, and 14C show torque curves during 1-2 upshift occurring at the same shift point with the same throttle opening degree but at different ambient temperatures. In these torque curves, reference characters TqB and TqM denote a torque before shift and a torque during shift, respectively. Torque TqM is mainly determined by servo activating hydraulic fluid pressure supplied to the on-coming friction device and thus remains invariable over variance in torque TqB due to change in air density since servo activating hydraulic fluid pressure determined for the same throttle opening degree is always the same.

Quality of shift may be evaluated on a ratio TqB/TqM. This ratio is optimum in FIG. 14B since the servo activating hydraulic fluid pressure is so adjusted as to provide a good shift at medium temperature. As ambient temperature varies, air density varies to cause a change in engine output.

As seen from FIG. 14A in comparison with FIG. 14B, torque TqB increases at low temperature, while as seen from FIG. 14C in comparison with FIG. 14B, torque TqB decreases at high temperature. Since torque TqM remains invariable, ratio TqB/TqM deviates from the optimum value in FIGS. 14A and 14C. As seen from FIG. 14A, the time interval t in FIG. 14A becomes longer than in FIG. 14B since, among the amount of energy, the torque transmitting portion thereof increases although the remaining inertia portion remains invariable. The time interval t in FIG. 14C becomes shorter than in FIG. 14B since the torque transmitting portion decreases although the inertia portion remains invariable.

Adaptive correction of variance in shift quality is described in connection with FIGS. 15A, 15B and 15C. With this control, variance in time interval t with ambient temperature variability is suppressed.

FIG. 15B shows a torque curve during 1-2 upshift under the same condition as in FIG. 14B. Similarly, FIGS. 15A and 15C show torque curves during the upshift under the same condition as in FIG. 14A and 14C. In these torque curves, the reference character TqT denotes a base portion of the torque during shift TqM for the torque transmitting portion, while the reference character denotes an additional portion TqI of the torque TqM for the inertia portion. Since the sum of TqT and TqI is determined by the servo activating hydraulic fluid pressure consisting of two portions determined in response to the first and second parameters TqSEN and No, respectively, it may be considered that TgT is in proportion to the first parameter TqSEN and TqI in proportion to the second parameter No. Referring to FIGS. 15A and 15C, since the first parameter TqSEN is in proportion to a ratio of torque TqB relative to standard torque TqB as shown in FIG. 15B, the base portion TqT varies in accordance with air density variability although the additional portion Tq1 remains invariable since the vehicle speed is the same. Thus, the time interval t in each of FIGS. 15A and 15C remains substantially the same as the time interval t in FIG. 15B.

Figure 16A:
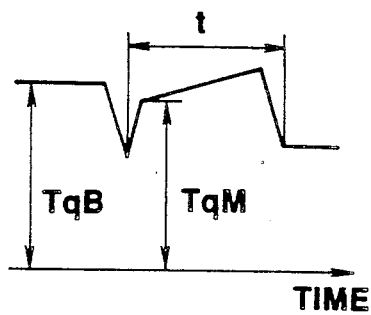
FIGS. 16A and 16B are torque curves during 1-2 upshift at different altitudes with the same throttle opening degree when the on-coming friction device is engaged by a servo activating hydraulic fluid pressure determined in response to throttle opening degree.
Figure 16B:
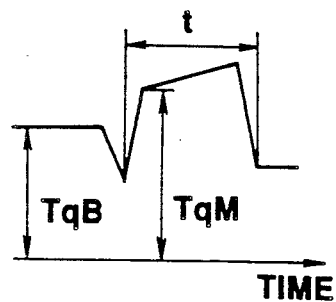
Figure 17A:
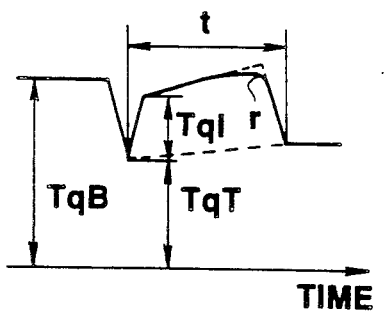
FIGS. 17A and 17B are torque curves during 1-2 upshift at the different altitudes as above with the same throttle opening degree when the on-coming friction device is engaged by a servo activating hydraulic fluid pressure determined according to the present invention.
Figure 17B:
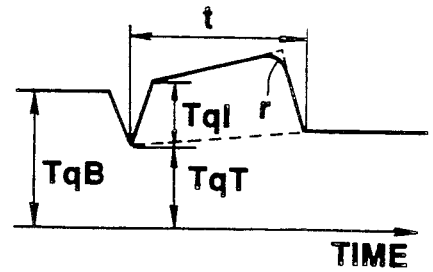

Referring to FIGS. 16A and 16B, it is described as to what influence is on a ratio shift due to variance in atmospheric pressure, and referring to FIGS. 17A and 17B, it is described as to how such influence is removed due to correction of servo activating hydraulic pressure according to the present invention.

As mentioned before, it is the conventional practice to use a pressure table which contains optimum servo activating hydraulic pressure values for 1-2 upshift versus different throttle opening degrees.

FIGS. 16A and 16B show torque curves during the upshift occurring at the same shift point with the same throttle opening degree but at different altitudes. Since, with the same throttle opening degree, the same servo activating hydraulic fluid pressure is supplied to engage the on-coming friction device, torque TqM remains invariable over variance in torque TqB due to change in air density. At high altitude with low atmospheric pressure, air density drops to cause a drop in engine output.

As seen from FIG. 16B in comparison with FIG. 16A, torque TqB drops at high altitude where air density is low. However, torque TqM remains invariable although the torque transmitting portion decreases. Thus, the time interval t becomes short at high altitude, and the ratio TqB/TqM deviates from the optimum value.

Adaptive correction of variance in shift quality due to altitude variability is described in connection with FIGS. 17A and 17B.

FIG. 17A shows a torque curve during 1-2 upshift under the same condition as in FIG. 16A. Similarly, FIG. 17B shows a torque curve during the upshift under the same condition as in FIG. 16B. Referring to FIG. 17B, since the first parameter TqSEN decreases in response to a drop in air density, the base portion TqT of the torque TqM decreases as torque TqB drops. Thus, ratio TqB/TqM is kept optimum and the time interval t remains substantially the same as the time interval t in FIG. 17A.

Referring again to FIGS. 15A, 15B, and 15C, it is seen that the trailing edge of torque curves are rounded as denoted by the reference characters r. This is caused by the fact that Qa drops in response to a reduction in intake airflow near the end of shift and servo activating hydraulic fluid pressure also drops. The same characteristic is seen in FIGS. 17A and 17B. This characteristic adds to improvement in shift quality.

If turbo charged engine is used, a turbo lag is unavoidable. With the same throttle opening degree, a ratio shift with turbo in operation and the same shift with turbo not yet in operation show different shift qualities when servo activating hydraulic fluid pressure is determined in response to throttle opening degree. This is because there is a difference in torque TqB. This variance in shift quality is corrected by effecting shift on servo activating hydraulic fluid pressure determined according to the present invention.

Referring to FIG. 18, a second embodiment according to the present invention is described. This embodiment is substantially the same as the previously described first embodiment except that instead of Qa/No, Qa/Nt is used in calculating a first parameter TqSEN in a sub routine shown in FIG. 18, where Nt is a turbine shaft speed. Turbine shaft speed Nt is determined by a product of No and a gear ratio q before a ratio shift Gear ratio g during ratio shift is not used in calculating Nt and thus a turbine speed Nt is not updated during ratio shift. The turbine speed Nt is updated upon completion of ratio shift.

Sub routine shown in FIG. 18 is substantially the same as sub routine shown in FIG. 6, but different in that new steps 100, 102, and 104 are added in stead of steps 82 and 84. Referring to FIG. 18, in step 100, output shaft speed No stored in step 80 and a gear ratio g which is determined by control unit 10 are used in calculating turbine speed Nt which is expressed by an equation $Nt = g \times No$. In step 102, a ratio Qa/Nt is calculated. In step 104, similar to step 84 shown in FIG. 6, a weighted average of (Qa/Nt)av is used to give a parameter TqSEN which is expressed as, $$TqSEN = Kc \times (Qa/Nt)av.$$

The use of Qa/Nt in TqSEN is advantageous over Qa/No in the following respects. Considering ranges in revolution speed versus gear positions of automatic transmission, it can be said that substantially the same range in turbine speed Nt is used for different gear positions, while ranges in output shaft speed No used for different gear positions are different although they have common area. For example, according to a shift point mapping, a maximum vehicle speed is 50 km/h for a 1-2 power-on upshift with full throttle, and a maximum vehicle speed 150 km/h for a 3-4 power on upshift with full throttle. Thus, range in Qa/No usable for 3-4 upshift becomes very narrow as compared to a range in Qa/No usable for 1-2 upshift since range of Qa is common over different gear positions. If, using TqSEN involving Qa/No, a table look-up operation of line pressure table as shown in FIG. 3 is performed in determining servo activating hydraulic fluid pressure for 3-4 upshift, the probability in error becomes high as compared to table look-up operation performed in determining servo activating hydraulic fluid pressure for 1-2 upshift. However, if Qa/Nt is used in TqSEN, the common line pressure table can be used in determining servo activating hydraulic fluid pressure for every ratio shift since substantially the same range in turbine speed Nt is used for different gear positions.

What is claimed is:

1. A system for controlling a servo activating hydraulic fluid pressure of an automatic transmission of a motor vehicle which includes an engine, said automatic transmission having an output shaft and being shiftable between a plurality of gear positions, said system comprising:

airflow rate detecting means for detecting an airflow rate of intake air admitted to said engine and for generating an airflow rate indicative signal indicative of said airflow rate detected;

revolution speed detecting means for detecting a revolution speed of said output shaft and for generating an output shaft revolution speed indicative signal indicative of said revolution speed detected;

a control unit operatively connected to said airflow rate detecting means and to said revolution speed detecting means, said control unit including means for determining a predetermined variable that is in a predetermined relationship with said output shaft revolution speed indicative signal and for generating a predetermined variable indicative signal indicative of said predetermined variable determined;

means responsive to said airflow rate indicative signal and said predetermined variable indicative signal for determining a first parameter as a predetermined function of a ratio of said airflow rate indicative signal to said predetermined variable indicative signal, and a second parameter in response to said output shaft revolution speed indicative signal; and means for determining said servo activating hydraulic fluid pressure in response to said first and second parameters.

2. A system as claimed in claim 1, wherein said predetermined relationship contains a product of said output shaft revolution speed indicative signal and a gear ratio of one of said plurality of gear positions established in said automatic transmission.

3. A system as claimed in claim 1, wherein said servo activating hydraulic fluid pressure is determined in response to said first and second parameters during a shift in gear position.

4. A method of controlling a servo activating hydraulic fluid pressure of an automatic transmission of a motor vehicle which includes an engine, said automatic transmission having an output shaft and being shiftable between a plurality of gear positions, said method comprising the steps of:

detecting an airflow rate of intake air admitted to said engine and generating an airflow rate indicative signal indicative of said airflow rate detected;
 detecting a revolution speed of said output shaft and generating an output shaft revolution speed indicative signal indicative of said revolution speed detected;
 determining a predetermined variable that is in a predetermined relationship with said output shaft revolution speed indicative signal;
 calculating a ratio of said airflow rate indicative signal to said output shaft revolution speed indicative signal;
 determining a first parameter in response to said ratio;
 determining a second parameter in response to said output shaft revolution speed indicative signal; and
 determining said servo activating hydraulic fluid pressure in response to said first and second parameters.

5. A system for controlling a servo activating hydraulic fluid pressure of an automatic transmission of a motor vehicle which includes an engine, said automatic transmission having an output shaft and being shiftable between a plurality of gear positions, said system comprising:

means for detecting an airflow rate of intake air admitted to said engine and for generating an airflow rate indicative signal indicative of said airflow rate detected;
 means for detecting a revolution speed of said output shaft and for generating an output shaft revolution speed indicative signal indicative of said revolution speed of said output shaft detected; and
 means responsive to said airflow rate indicative signal and to said output shaft revolution speed indicative signal for determining a first parameter, and a second parameter in response to said output shaft revolution speed indicative signal, and for determining said servo activating hydraulic fluid pressure in response to said first and second parameters.

6. A system for an automatic transmission of a motor vehicle which includes an engine, said automatic transmission having an output shaft and a servo activated friction device and being shiftable between a plurality of gear positions, said system comprising:

airflow rate detecting means for detecting an airflow rate of intake air admitted to said engine and for generating an airflow rate indicative signal indicative of said airflow rate detected;
 revolution speed detecting means for detecting a revolution speed of said output shaft and for generating an output shaft revolution speed indicative signal indicative of said revolution speed detected;
 a control unit operatively connected to said airflow rate detecting means and to said revolution speed detecting means, said control unit including,
 means for determining a predetermined variable that is in a predetermined relationship with said output shaft revolution speed indicative signal and for generating a predetermined variable indicative signal indicative of said predetermined variable determined;
 means responsive to said airflow rate indicative signal and to said predetermined variable indicative signal for determining a first parameter as a predetermined function of a ratio of said airflow rate indicative signal to said predetermined variable indicative signal, and a second parameter in response to said output shaft revolution speed indicative signal; and
 means for determining a servo activating hydraulic fluid pressure in response to said first and second parameters; and
means for adjusting said servo activating hydraulic fluid pressure supplied to said servo activated friction device.

* * * * *